US010337613B2

(12) United States Patent
Attard et al.

(10) Patent No.: US 10,337,613 B2
(45) Date of Patent: Jul. 2, 2019

(54) TRANSMISSION SHIFT TORQUE MANAGEMENT WITH FUEL ENLEANMENT

(71) Applicants: William P Attard, Brighton, MI (US); Phillipp A Seyfried, Rochester, MI (US)

(72) Inventors: William P Attard, Brighton, MI (US); Phillipp A Seyfried, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 251 days.

(21) Appl. No.: 15/386,462

(22) Filed: Dec. 21, 2016

(65) Prior Publication Data
US 2018/0171912 A1 Jun. 21, 2018

(51) Int. Cl.
| | |
|---|---|
| F16H 63/50 | (2006.01) |
| F02P 5/04 | (2006.01) |
| F02D 41/14 | (2006.01) |
| F02D 41/02 | (2006.01) |
| F02D 41/34 | (2006.01) |

(Continued)

(52) U.S. Cl.
CPC ......... *F16H 63/502* (2013.01); *F02D 41/023* (2013.01); *F02D 41/1454* (2013.01); *F02D 41/1475* (2013.01); *F02D 41/34* (2013.01); *F02P 5/045* (2013.01); *F02P 5/1504* (2013.01); *F02D 41/0007* (2013.01); *F02D 2200/101* (2013.01); *F02D 2250/21* (2013.01);
(Continued)

(58) Field of Classification Search
CPC ........... F02D 41/0215; F02D 2200/101; F02D 41/0007; F16H 63/502
See application file for complete search history.

(56) References Cited

U.S. PATENT DOCUMENTS

| | | | |
|---|---|---|---|
| 7,028,670 B2 | 4/2006 | Doering | |
| 8,311,721 B2 * | 11/2012 | Whitney | F02D 37/02 123/406.23 |

(Continued)

FOREIGN PATENT DOCUMENTS

FR 2883041 A1 9/2006

OTHER PUBLICATIONS

J. Stokes, T.H. Lake and R.J. Osborne, A Gasoline Engine Concept for Improved Fuel Economy—The Lean Boost System, SAE Technical Paper Series 2000-01-2902, Oct. 16-19, 2000, 14 pages.

(Continued)

*Primary Examiner* — Stacey A Fluhart
(74) *Attorney, Agent, or Firm* — Ralph E. Smith

(57) ABSTRACT

Control systems and methods for a vehicle comprising an automatic transmission utilize a sensor configured to measure an operating parameter of an engine of the vehicle. A controller of the vehicle is configured to detect an imminent shift of the automatic transmission based on the measured operating parameter of the engine. In response to detecting the imminent shift of the automatic transmission, the controller is configured to decrease torque output of the engine by a desired amount by enleaning an air/fuel charge provided to a cylinder of the engine. After decreasing the torque output of the engine by the desired amount, the controller is configured to control the automatic transmission to perform the shift. The decreasing of the engine torque output provides for a smoother shift of the automatic transmission and increased engine fuel economy.

14 Claims, 4 Drawing Sheets

(51) Int. Cl.
*F02P 5/15* (2006.01)
*F02D 41/00* (2006.01)

(52) U.S. Cl.
CPC ...... *F02D 2250/22* (2013.01); *F02D 2400/12* (2013.01); *Y02T 10/44* (2013.01); *Y02T 10/46* (2013.01)

(56) References Cited

U.S. PATENT DOCUMENTS

| | | | |
|---|---|---|---|
| 2004/0014564 A1* | 1/2004 | Jager | B60W 10/02 477/115 |
| 2008/0262695 A1* | 10/2008 | Gibson | F02D 41/307 701/102 |
| 2009/0156358 A1* | 6/2009 | Shamis | F01N 3/0842 477/100 |
| 2010/0274463 A1* | 10/2010 | Itoga | F02D 13/0246 701/102 |
| 2012/0180759 A1* | 7/2012 | Whitney | F02D 13/0219 123/406.23 |
| 2012/0245827 A1 | 9/2012 | Glugla et al. | |
| 2014/0288791 A1* | 9/2014 | Iizuka | B60W 10/06 701/54 |
| 2015/0353074 A1* | 12/2015 | Kinoshita | B60K 6/445 701/22 |

OTHER PUBLICATIONS

William P. Attard and Hugh Blaxill, A Gasoline Fueled Pre-Chamber Jet Ignition Combustion System at Unthrottled Conditions, SAE International 2012-01-0386, Apr. 16, 2012, 13 pages.

* cited by examiner

TRANSMISSION SHIFT TORQUE MANAGEMENT WITH FUEL ENLEANMENT

FIELD

The present application generally relates to internal combustion (IC) engine torque control and, more particularly, to fast-path individual combustion event torque reduction by means of fuel enleanment and example uses for transmission shift torque management and vehicle stability control intervention.

BACKGROUND

Automatic transmissions are configured to transfer drive torque from an IC engine to a drivetrain (e.g., wheels) via a particular gear ratio. For example, a six-speed automatic transmission defines six selectable gear ratios for the transfer of the drive torque. A greater number of speeds for an automatic transmission generally means that a larger gearing spread is achieved and that a higher number of gear shifts could be experienced by the driver. To mitigate noise/vibration/harshness (NVH) and to reach fast shift speeds for performance reasons, accurate and quick torque control (mainly torque reduction) of the IC engine is required. Three primary paths of engine torque control are spark retardation, fuel/cylinder shutoff, and airflow control (throttle valve, wastegate valve, etc.).

Spark retardation and fuel/cylinder shutoff typically decrease torque output of the engine faster than airflow control. Spark retardation, however, requires additional enrichment due to delayed combustion phasing at higher power levels, and is thereby limited, as well as having an overall combustion limit. Fuel/cylinder shutoff is only able to change output torque in fixed increments according to the ratio of firing versus motoring cylinders, e.g., one cylinder equals 25% torque reduction on a four cylinder engine. Additionally, fuel/cylinder shutoff causes an imbalance for the rotational speed.

These torque control paths are also sometimes inadequate for decreasing the engine torque output by a desired amount for such higher-speed automatic transmissions (e.g., 70% or more torque reduction), particularly when the engine is operating at a high speed/load. Spark retardation also causes increased exhaust gas temperatures, which potentially damages components (e.g., for turbocharged applications) if not mitigated by additional enrichment. Accordingly, while such transmission control systems work well for their intended purpose, there remains a need for improvement in the relevant art.

SUMMARY

According to one aspect of the invention, a control system for a vehicle comprising an automatic transmission is presented. In one exemplary implementation, the system comprises a sensor configured to measure an operating parameter of an engine of the vehicle and a controller. The controller is configured to detect an imminent shift of the automatic transmission based on the measured operating parameter of the engine and, in response to detecting the imminent shift of the automatic transmission, decrease torque output of the engine by a desired amount. This torque reduction is performed by enleaning an air/fuel charge provided to a cylinder of the engine. The controller is further configured to, after decreasing the torque output of the engine by the desired amount, control the automatic transmission to perform the shift. The decreasing of the engine torque output provides for a smoother shift of the automatic transmission and increased engine fuel economy.

In some implementations, decreasing the engine torque output further comprises advancing an ignition timing of the enleaned air/fuel charge within the cylinder. In some implementations, advancing the ignition timing further comprises determining an advancement of the ignition timing that will prevent a misfire of the enleaned air/fuel charge. In some implementations, the engine comprises a turbocharger, and the advanced ignition of the enleaned air/fuel charge causes exhaust energy at the turbocharger to decrease thereby further decreasing the torque output of the engine.

In some implementations, the controller is further configured to generate a torque reserve by enleaning the air/fuel charge. In some implementations, the controller is further configured to detect and idle condition of the engine and, in response to detecting the idle condition, generate the torque reserve. In some implementations, the controller is further configured, in response to a request from a vehicle stability control system, generate the torque reserve or increase engine torque output by enriching the air/fuel charge.

According to another aspect of the invention, a method of controlling a vehicle comprising an automatic transmission is presented. In one exemplary implementation, the method comprises: measuring, by a controller using a sensor, an operating parameter of an engine of the vehicle; detecting, by the controller, an imminent shift of the automatic transmission based on the measured operating parameter of the engine; in response to detecting the imminent shift of the automatic transmission, decreasing, by the controller, torque output of the engine by a desired amount by enleaning an air/fuel charge provided to a cylinder of the engine; and after decreasing the torque output of the engine by the desired amount, controlling, by the controller, the automatic transmission to perform the imminent shift. The decreasing of the engine torque output provides for a smoother shift of the automatic transmission and increased engine fuel economy.

In some implementations, decreasing the torque output of the engine by the desired amount further comprises advancing an ignition timing of the enleaned air/fuel charge within the cylinder. In some implementations, advancing the ignition timing further comprises determining, by the controller, an advancement of the ignition timing that will prevent a misfire of the enleaned air/fuel charge. In some implementations, the engine comprises a turbocharger, and the advanced ignition of the enleaned air/fuel charge causes exhaust energy at the turbocharger to decrease thereby further decreasing the torque output of the engine.

In some implementations, the method further comprises generating, by the controller, a torque reserve by enleaning the air/fuel charge. In some implementations, the method further comprises detecting, by the controller, an idle condition of the engine and, in response to detecting the idle condition, generating, by the controller, the torque reserve. In some implementations, the method further comprises, in response to a request from a vehicle stability control system, generating, by the controller, the torque reserve or increasing, by the controller, engine torque output by enriching the air/fuel charge.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
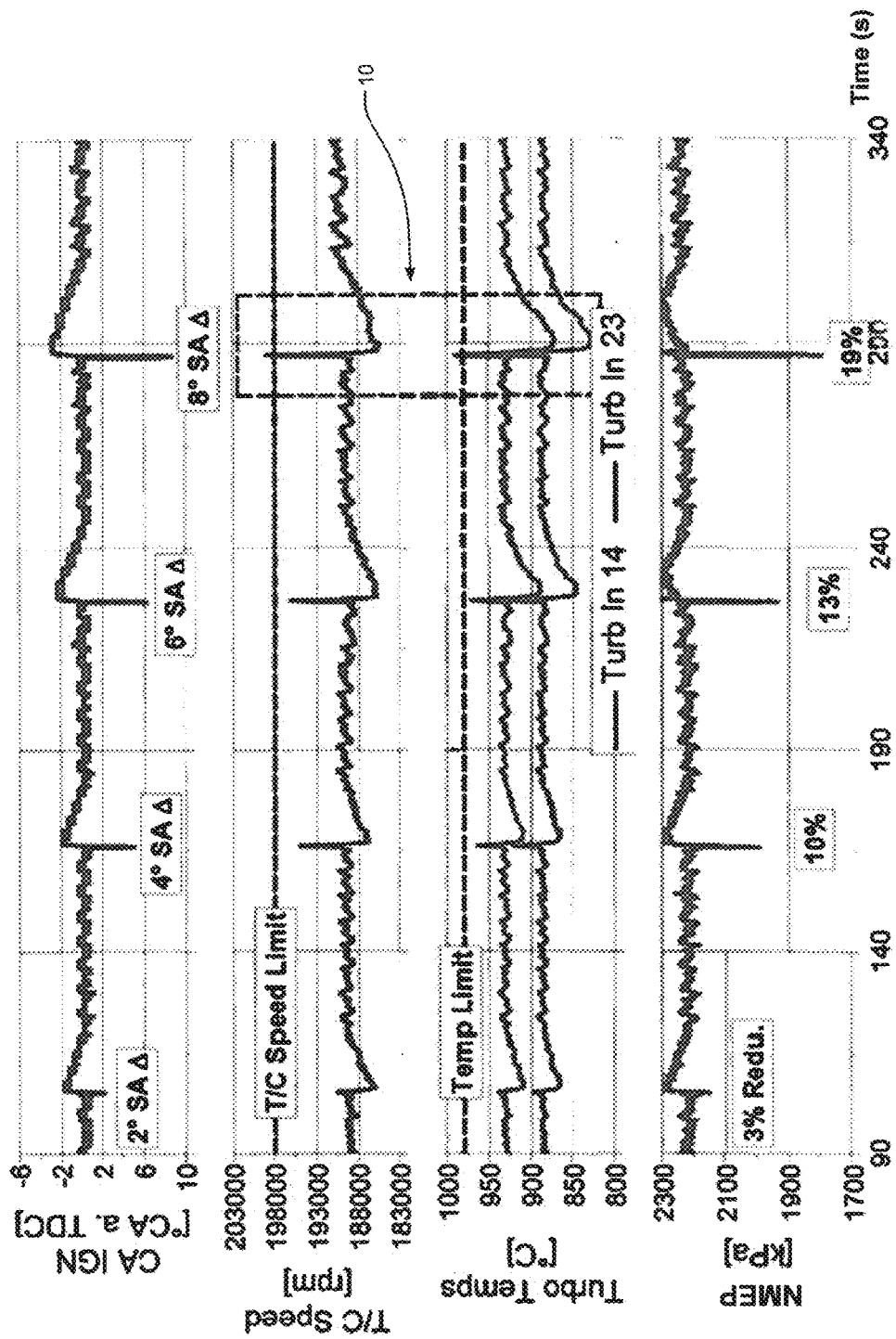
FIG. 1 depicts plots of turbocharger speed/temperature and engine torque reduction for an example four cylinder engine at various levels of spark retardation according to the principles of the present disclosure.

As mentioned above, conventional engine torque control paths (spark retardation, airflow, etc.) are sometimes inadequate for providing the requisite torque output reduction as requested, e.g., by automatic transmissions or vehicle stability control systems. FIG. 1 illustrates example plots for an example four cylinder, turbocharged engine. While any suitable turbocharger configuration is applicable, the example engine in FIG. 1 comprises a twin scroll turbine turbocharger with one scroll associated with cylinders 1 and 4 (Turb In 14) and the other scroll associated with cylinders 2 and 3 (Turb In 23). These plots include crank angle ignition (CA IGN) timing (in degrees after top dead center, or ° CA a. TDC), turbocharger (T/C) speed (in revolutions per minute, or rpm, for the turbine), exhaust gas temperature upstream of the turbocharger (in degrees Celsius, or ° C.), and net mean effective pressure (NMEP, in kilopasca s, or kPa), which corresponds to indicated engine torque output.

As shown, ignition is periodically retarded by a 2° increment (spark advance delta, or SA A) up to a maximum of 8°. At 8° spark retardation, turbocharger speed and exhaust gas inlet temperature to the turbocharger (specifically, Turb In 23) both exceed maximum operational thresholds (see region 10). Even at this unacceptable level of spark retardation, engine torque output is only decreased by approximately 19%. Many higher-speed automatic transmissions have very high inertia and thus require a much larger torque reduction for smooth gear shifts. Sufficient torque reduction capability by means of spark retardation is particularly difficult at high load/speed conditions (e.g., ~5200 RPM engine speed in FIG. 1) where, for turbocharged applications, high exhaust gas temperature is capable of causing damage to components.

Figure 2:
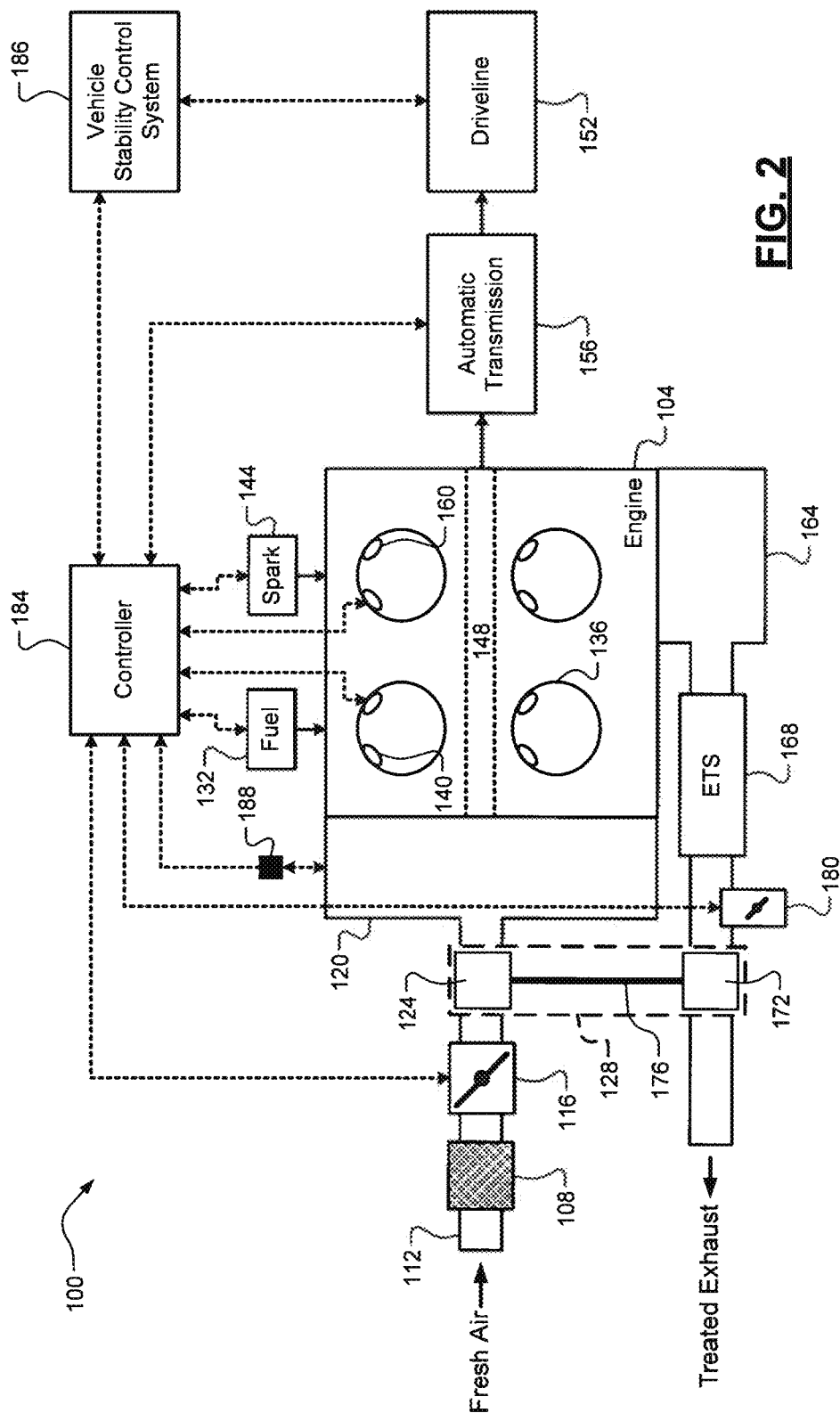
FIG. 2 depicts a diagram of an example engine system according to the principles of the present disclosure.

Accordingly, systems and methods for fast-path torque management via fuel enleanment are presented. Referring now to FIG. 2, an example engine system 100 is illustrated. The engine system 100 includes an engine 104 configured to combust an air/fuel mixture to generate drive torque. Fresh air is drawn through an air filter 108, an induction pipe 112, and a throttle valve 116. The fresh air is forced into an intake manifold 120 by a compressor 124 of a turbocharger 128 resulting in pressurized air in the intake manifold 120. The pressurized air in the intake manifold is combined with fuel from fuel injectors 132 and the resulting air/fuel mixture is provided to each of a plurality of cylinders 136 via respective intake valves 140. It will be appreciated that the fuel injectors 132 could inject the fuel via intake ports (not shown) of the cylinders 136 (port fuel injection) or directly into the cylinders 136 (direct fuel injection). In one non-limiting example, the engine 104 has four cylinders as shown. The portion of the air/fuel mixture that is provided to each cylinder 136 is also known as an air/fuel charge.

The air/fuel charge is compressed within each cylinder 136 by a respective piston (not shown) and ignited by a spark provided by a respective spark plug 144. The combustion of the compressed air/fuel mixture drives the pistons, which rotatably turn a crankshaft 148 to generate drive torque. The drive torque is transferred to a driveline 152 (e.g., wheels) via an automatic transmission 156. Exhaust gas resulting from combustion is expelled from the cylinders 136 via respective exhaust valves 160 and into an exhaust manifold 164. Some of the exhaust gas is treated by an exhaust treatment system 168 before being released into the atmosphere. Some of the exhaust gas is also recirculated from the exhaust manifold 164 to a turbine 172 of the turbocharger 128. The exhaust gas energy drives the turbine 172, which in turn drives the compressor 124 via a shaft 176. A wastegate valve 180 is configured to expel exhaust gas pressure ("boost").

A controller 184 controls operation of the engine 104 and its related components. The term "controller" herein refers to any suitable control unit, such as an application-specific integrated circuit (ASIC) or a computing device having one or more processors and a non-transitory memory with a set of instructions stored thereon. Non-limiting examples of components that are controllable by the controller 184 include the throttle valve 116, the fuel injectors 132, the intake valves 140, the spark plugs 144, the exhaust valves 160, and the wastegate valve 180. While a single controller 184 is shown, in some implementations there are multiple controllers (e.g., a separate transmission controller).

The controller 184 is configured to communicate with one or more vehicle stability control (VSC) systems 186. These VSC systems 186 are configured to increase/decrease torque at the driveline 152 to help the driver maintain vehicle stability/control. Non-limiting examples of these VSC systems 186 include an anti-lock braking system (ABS) and a traction control system (TCS). For example only, one wheel of the driveline 152 may be slipping and thus the torque provided to an opposing wheel of the driveline 152 could be increased to compensate. The controller 184 is also configured to receive a set of measured engine operating parameters from a set of sensors 188. Non-limiting examples of the parameters measured by the sensor(s) 188 include mass air flow (MAF) and/or manifold absolute pressure (MAP) (indicative of engine load), rotational speed of the crankshaft 148 (indicative of engine speed), and rotational speed at the driveline 152 (indicative of vehicle speed).

Figure 3:
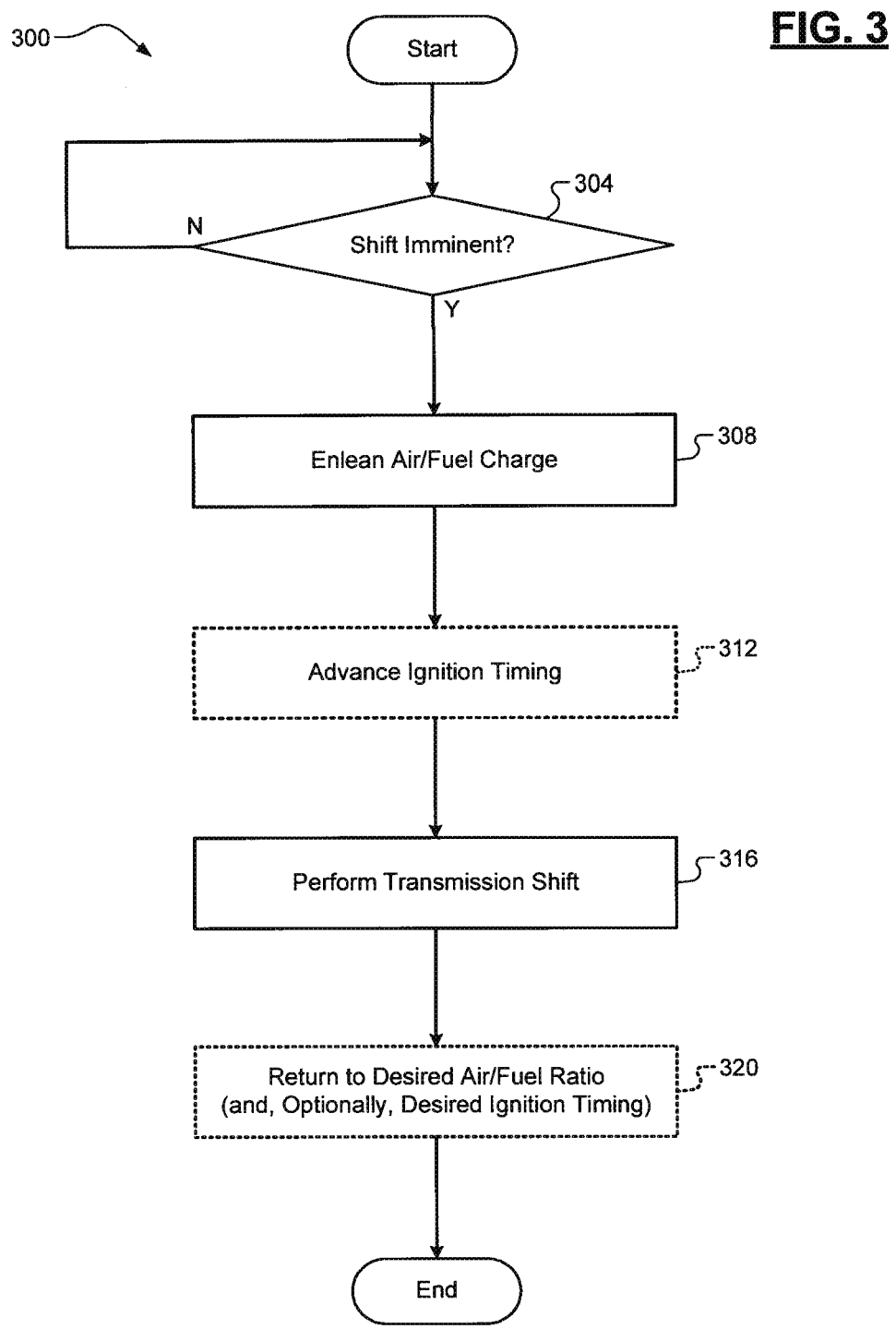
FIG. 3 is a flow diagram of an example method of transmission shift torque management with fuel enleanment according to the principles of the present disclosure.

Referring now to FIG. 3, a flow diagram of an example method 300 of transmission shift torque management with fuel enleanment is illustrated. At 304, the controller 184 determines whether a shift of the transmission 156 is imminent (i.e., expected to occur within a future period). In one exemplary implementation, this determination is made by the controller 184 based on the measured operating parameter(s) from sensor(s) 188. For example only, if engine speed is approaching an upper/maximum limit, also known as a red line, then a shift of the transmission 156 is performed. When the imminent shift is detected, the method 300 proceeds to 308. Otherwise, the method 300 ends or returns to 304. At 308, the controller 184 enleans the air/fuel charge provided to the engine 104. In one exemplary implementation, the controller 184 performs this enleanment by shortening an energization duration for the fuel injectors 132.

At optional 312, the controller 184 advances the ignition (spark) timing to decrease the torque output of the engine 104 by the desired amount. In one exemplary implementation, the controller 184 temporarily advances the spark timing to maintain combustion stability (e.g., to avoid a misfire) for the enleaned air/fuel charge. It will be appreciated that in some implementations, steps 308 and 312 at least partially overlap or are performed simultaneously. Fuel enleanment, however, is also usable without spark advancement. At 316, the controller 184 controls the transmission 156 to execute the shift. The method 300 then ends or returns to 304. It will be appreciated that in some implementations, a further step 320 after the performing of the transmission shift involves the controller 184 both enriching the air/fuel charge (back to a desired air/fuel ratio) and retarding the spark timing (back to a desired spark timing). The temporary engine torque reduction enables the transmission 156 to perform a smoother shift (e.g., less or no noticeable jerk to the driver), and the temporary fuel enleanment provides for increased engine fuel economy. After such a step 320, the method 300 would then end or return to 304.

Figure 4:
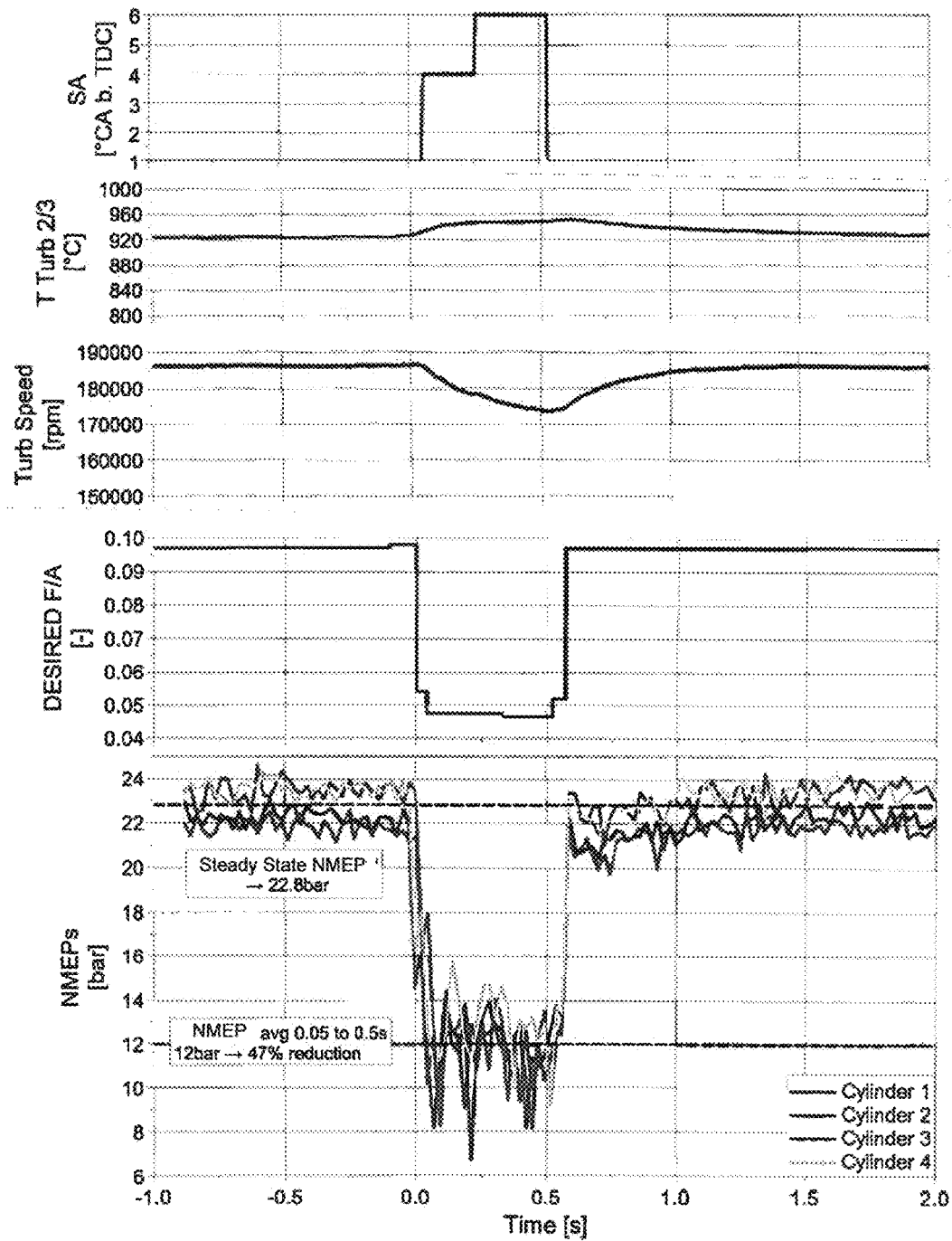
FIG. 4 depicts plots of spark timing, turbocharger speed/temperature, fuel-to-air ratio, and engine torque reduction for the example four cylinder engine of FIG. 1 using the example method of FIG. 3 according to the principles of the present disclosure.

Referring now to FIG. 4, example plots for the same example four cylinder, turbocharged engine discussed with respect to FIG. 1 are illustrated. These plots include spark advance (SA) (in crank angle degrees before top dead center, or CA° b. TDC), exhaust temperature into the turbocharger (Turb) (T, in ° C.) and speed (in revolutions per minute, or rpm, for the turbine), desired fuel-to-air (F/A) ratio, and net mean effective pressure (NMEP, in bar), which corresponds to indicated engine torque output. As shown, at approximately time t=0 seconds, the desired FlA ratio is decreased from 0.10 to approximately 0.05. This represents the fuel enleanment as discussed herein. In other words, by this ratio decreasing, less fuel is being injected into the engine relative to the amount of air being drawn in. Ignition (spark) timing is also controlled in conjunction with the fuel enleanment. More particularly, the spark timing is advanced to maintain stability for the combustion of the enleaned air/fuel charge (e.g., to prevent/avoid a misfire).

As previously mentioned, this spark advancement is performed either simultaneously or shortly after the fuel enleanment, but the two periods at least partially overlap. The coordinated timing of these operations needs to be precise in order to maintain combustion stability and maximize torque reduction. In some implementations, the spark advance is performed in multiple stages or, in other words, the spark advance is stepped up to a desired spark advance (e.g., 5° b. TDC). The fuel enleanment and spark advancement results in an average torque reduction of approximately 47% over the period from approximately t=0.05 seconds to t=0.5 seconds. Also, as shown, the temperature and speed of the turbocharger do not drastically change, and thus potential damage to components is avoided. By further enleaning the air/fuel charge, in conjunction with precise ignition timing control and potentially other suitable torque reduction techniques, the desired torque reduction levels are achievable.

It will be appreciated that in some implementations, the fuel enleanment techniques discussed herein are also used to generate torque reserves during certain engine operating conditions. For example only, an air/fuel charge could be enleaned during engine idle operation to generate a torque reserve. As discussed previously herein, fuel enleanment and enrichment represent fast paths for engine torque control. After generating the torque reserve via fuel enleanment, the air/fuel charge could then be enriched in response to a load, such as an air conditioning system being activated. By selectively enleaning the air/fuel charge, engine fuel economy is able to be increased and the torque reduction potential is able to be increased.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle comprising an automatic transmission, the system comprising:
    a sensor configured to measure an operating parameter of a spark-ignition engine of the vehicle; and
    a controller configured to:
        detect a need to perform a shift of the automatic transmission based on the measured operating parameter of the engine;
        in response to detecting the need to perform the shift of the automatic transmission, decrease torque output of the engine by a desired amount by enleaning an air/fuel charge provided to a cylinder of the engine by decreasing an energization duration of a fuel injector of the engine that is associated with the cylinder; and
        after decreasing the torque output of the engine by the desired amount, control the automatic transmission to perform the shift.

2. The system of claim 1, wherein decreasing the torque output of the engine by the desired amount further comprises advancing an ignition timing of the enleaned air/fuel charge within the cylinder.

3. The system of claim 2, wherein advancing the ignition timing further comprises determining an advancement of the ignition timing that will prevent a misfire of the enleaned air/fuel charge.

4. The system of claim 2, wherein the engine comprises a turbocharger, and wherein the advanced ignition timing of the enleaned air/fuel charge causes exhaust energy at the turbocharger to decrease thereby further decreasing the torque output of the engine.

5. The system of claim 2, wherein the controller is further configured to generate a torque reserve by the enleaning of the air/fuel charge.

6. The system of claim 5, wherein the controller is further configured to detect an idle condition of the engine and, in response to detecting the idle condition, generate the torque reserve.

7. The system of claim 5, wherein the controller is further configured, in response to a request from a vehicle stability control system, generate the torque reserve or increase engine torque output by enriching the air/fuel charge.

8. A method for controlling a vehicle comprising an automatic transmission, the method comprising:
    measuring, by a controller using a sensor, an operating parameter of a spark-ignition engine of the vehicle;
    detecting, by the controller, a need to perform a shift of the automatic transmission based on the measured operating parameter of the engine;
    in response to detecting the need to perform the shift of the automatic transmission, decreasing, by the controller, torque output of the engine by a desired amount by enleaning an air/fuel charge provided to a cylinder of the engine by decreasing an energization duration of a fuel injector of the engine that is associated with the cylinder; and after decreasing the torque output of the engine by the desired amount, controlling, by the controller, the automatic transmission to perform the imminent shift.

9. The method of claim 8, wherein decreasing the engine torque output by the desired amount further comprises advancing, by the controller, an ignition timing of the enleaned air/fuel charge within the cylinder.

10. The method of claim 9, wherein advancing the ignition timing further comprises determining, by the controller, an advancement of the ignition timing that will prevent a misfire of the enleaned air/fuel charge.

11. The method of claim 9, wherein the engine comprises a turbocharger, and wherein the advanced ignition timing of the enleaned air/fuel charge causes exhaust energy at the turbocharger to decrease thereby further decreasing the torque output of the engine.

12. The method of claim 8, further comprising generating, by the controller, a torque reserve by the enleaning of the air/fuel charge.

13. The method of claim 12, further comprising detecting, by the controller, an idle condition of the engine and, in response to detecting the idle condition, generating, by the controller, the torque reserve.

14. The method claim 12, further comprising in response to a request from a vehicle stability control system, generating, by the controller, the torque reserve or increasing, by the controller, engine torque output by enriching the air/fuel charge.

\* \* \* \* \*